US011331974B2

(12) United States Patent
Ditzel et al.

(10) Patent No.: US 11,331,974 B2
(45) Date of Patent: May 17, 2022

(54) BRACKET FOR VEHICLE STABILIZER, VEHICLE STABILIZER AND METHOD FOR MANUFACTURING VEHICLE STABILIZER

(71) Applicant: Sumitomo Riko Company Limited, Aichi (JP)

(72) Inventors: Jörg Ditzel, Freigericht (DE); Artur Kerbs, Hammersbach (DE); Valéri Becker, Schotten (DE)

(73) Assignee: Sumitomo Riko Company Limited, Aichi (JP)

( * ) Notice: Subject to any disclaimer, the term of this patent is extended or adjusted under 35 U.S.C. 154(b) by 0 days.

(21) Appl. No.: 16/885,299

(22) Filed: May 28, 2020

(65) Prior Publication Data

US 2020/0376917 A1    Dec. 3, 2020

(30) Foreign Application Priority Data

Jun. 3, 2019    (DE) ................. 10 2019 003 884.3

(51) Int. Cl.
    *B60G 21/055*    (2006.01)
(52) U.S. Cl.
    CPC .... *B60G 21/0551* (2013.01); *B60G 2202/135* (2013.01); *B60G 2204/122* (2013.01);
    (Continued)
(58) Field of Classification Search
    CPC .......... B60G 21/0551; B60G 2202/135; B60G 2204/122; B60G 2204/4102;
    (Continued)

(56) References Cited

U.S. PATENT DOCUMENTS

| 9,347,457 B2 * | 5/2016 | Ahrens ................. F04D 29/046 |
| 2012/0024463 A1 * | 2/2012 | Grundmeier ........ B29C 66/1122 |
| | | 156/91 |

(Continued)

FOREIGN PATENT DOCUMENTS

| DE | 102017202560 A1 * | 8/2018 | ......... B60G 21/0551 |
| KR | 101570320 B1 * | 11/2015 | |

(Continued)

OTHER PUBLICATIONS

English translation of WO 2019025741 A1 Retrieved from Espacenet on Jun. 17, 2021 (Year: 2021).*

(Continued)

*Primary Examiner* — Paul N Dickson
*Assistant Examiner* — Caitlin Anne Miller
(74) *Attorney, Agent, or Firm* — JCIPRNET

(57) ABSTRACT

A bracket for a vehicle stabilizer is provided and includes an elastomer element for receiving a stabilizer spring, a first and a second bracket element. The first and the second bracket elements are connectable in such a way that the elastomer element is fixed between the first and the second bracket elements. A connection means for connecting the first and the second bracket elements is formed on the first and second bracket elements, the connection means has at least one connection pin and a connection recess. In a connection state of the first bracket element and of the second bracket element, the connection pin is inserted into the connection recess, and in the connection state the connection pin is frictionally fixed in the connection recess and/or the connection pin is riveted in the connection recess in a positive manner and/or the connection pin is cohesively fixed in the connection recess.

5 Claims, 3 Drawing Sheets

(52) U.S. Cl.
CPC ............... *B60G 2204/4102* (2013.01); *B60G 2204/4307* (2013.01); *B60G 2206/73* (2013.01); *B60G 2206/8106* (2013.01); *B60G 2206/821* (2013.01); *B60G 2206/82092* (2013.01)

(58) Field of Classification Search
CPC ........ B60G 2204/4307; B60G 2206/73; B60G 2206/8106; B60G 2206/82092; B60G 2206/821
See application file for complete search history.

(56) References Cited

U.S. PATENT DOCUMENTS

| | | | | |
|---|---|---|---|---|
| 2012/0097827 | A1* | 4/2012 | Klink | B60G 21/0551 248/635 |
| 2015/0028531 | A1* | 1/2015 | Grundmeier | B60G 21/0551 267/141.2 |
| 2017/0008365 | A1* | 1/2017 | Tsukamoto | F16F 1/3835 |
| 2018/0141402 | A1* | 5/2018 | Oh | B60G 21/0551 |
| 2019/0100066 | A1* | 4/2019 | Knetsch | B60G 13/16 |
| 2019/0160906 | A1* | 5/2019 | Umeno | B60G 21/0551 |
| 2021/0122207 | A1* | 4/2021 | Baudelet | B60G 21/0551 |

FOREIGN PATENT DOCUMENTS

| | | | |
|---|---|---|---|
| WO | 2011102373 | 8/2011 | |
| WO | 2017216247 | 12/2017 | |
| WO | WO-2019025741 A1 * | 2/2019 | ......... B60G 21/0551 |

OTHER PUBLICATIONS

"Office Action of German Counterpart Application", dated Feb. 5, 2020, with English translation thereof, p. 1-p. 15.

* cited by examiner

BRACKET FOR VEHICLE STABILIZER, VEHICLE STABILIZER AND METHOD FOR MANUFACTURING VEHICLE STABILIZER

CROSS REFERENCE TO RELATED APPLICATIONS

This application claims the priority benefit of Germany Patent Application No. 10 2019 003 884.3, filed on Jun. 3, 2019. The entirety of the above-mentioned patent application is hereby incorporated by reference herein and made a part of this specification.

BACKGROUND

Technical Field

The present disclosure relates to a bracket for a vehicle stabilizer, a vehicle stabilizer comprising such a bracket, and a method for manufacturing a vehicle stabilizer.

Description of Related Art

To arrange a vehicle stabilizer or a stabilizer spring in the chassis of an automobile, it is known to couple the two ends of the stabilizer spring formed as a torsion bar spring to the chassis via two coupling rods. In order to rotatably support the stabilizer spring on the vehicle body, brackets are usually used, which are arranged on the stabilizer spring and are secured to the vehicle body. The brackets usually have an elastomer bearing, which receives the stabilizer spring, and a pair of clamp-shaped bracket elements, which encompass the elastomer bearing and which can be screwed to the vehicle body. During transport, assembly and/or change of the stabilizer spring, the brackets can slip or fall apart, which is disadvantageous. Furthermore, it is desirable to increase the rigidity of brackets and to simplify the manufacture of the brackets and the assembly of the vehicle stabilizer or the stabilizer spring.

SUMMARY

The present disclosure provides a bracket for a vehicle stabilizer, a vehicle stabilizer comprising such a bracket, and a method for manufacturing a vehicle stabilizer.

According to one embodiment, the disclosure provides a bracket for a vehicle stabilizer, and the bracket comprises an elastomer element that receives a stabilizer spring, a first bracket element and a second bracket element. The first bracket element and the second bracket element are connectable in such a way that the elastomer element is fixed between the first bracket element and the second bracket element. A connection means for connecting the first bracket element and the second bracket element is formed on the first and second bracket elements, and the connection means has at least one connection pin and a connection recess. In a connection state of the first bracket element and of the second bracket element, the connection pin is inserted into the connection recess, and in the connection state the connection pin is frictionally fixed (fixed in a force-fit manner) in the connection recess and/or the connection pin is riveted in the connection recess in a positive (form fit) manner and/or the connection pin is cohesively fixed (fixed by substance-to-substance bond) in the connection recess.

According to another embodiment, the disclosure provides a bracket for a vehicle stabilizer, and the bracket comprises an elastomer element that receives a stabilizer spring, a first bracket element and a second bracket element. The first bracket element and the second bracket element are connectable in such a way that the elastomer element is fixed between the first bracket element and the second bracket element. A connection means for connecting the first bracket element and the second bracket element is formed on the first and second bracket elements, and the connection means has a first connection sleeve and a second connection sleeve. In a connection state of the first bracket element and of the second bracket element, the first connection sleeve is at least partially inserted into the second connection sleeve. In the connection state the first connection sleeve is frictionally fixed in the second connection sleeve. An outer circumferential surface of the first connection sleeve and/or an inner circumferential surface of the second connection sleeve has a rib structure.

According to another embodiment, the disclosure provides a vehicle stabilizer, comprising a stabilizer spring and a bracket, wherein the stabilizer spring is received in the elastomer element, the first bracket element and the second bracket element are in the connection state, and the elastomer element is fixed between the first bracket element and the second bracket element.

According to another embodiment, the disclosure provides a method for manufacturing a vehicle stabilizer, comprising: receiving a stabilizer spring in an elastomer element; providing a first bracket element and a second bracket element; providing a connection means, comprising a connection pin and a connection recess, on the first bracket element and the second bracket element; connecting the first bracket element and the second bracket element such that the elastomer element is fixed between the first bracket element and the second bracket element, the connection pin being inserted into the connection recess; and frictionally fixing (fixing in a force-fit manner) the connection pin in the connection recess and/or positively (by means of a form fit) riveting the connection pin in the connection recess and/or cohesively fixing (fixing by substance-to-substance bond) the connection pin in the connection recess in order to bring the first bracket element and the second bracket element into a connection state.

According to another embodiment, to the disclosure provides a method for manufacturing a vehicle stabilizer, comprising: receiving a stabilizer spring in an elastomer element; providing a first bracket element and a second bracket element; providing a connection means, comprising a first connection sleeve and a second connection sleeve, on the first bracket element and the second bracket element; an outer circumferential surface of the first connection sleeve and/or an inner circumferential surface of the second connection sleeve having a rib structure; connecting the first bracket element and the second bracket element such that the elastomer element is fixed between the first bracket element and the second bracket element, the first connection sleeve being inserted into the second connection sleeve at least partially; and frictionally fixing the first connection sleeve in the second connection sleeve in order to bring the first bracket element and the second bracket element into a connection state.

BRIEF DESCRIPTION OF THE DRAWINGS

Some embodiments of the disclosure will be described in more detail below with reference to the attached figures. It goes without saying that the present disclosure is not restricted to these embodiments and that individual features of the embodiments can be combined to form further embodiments within the scope of the appended claims.

DESCRIPTION OF THE EMBODIMENTS

Figure 1A:
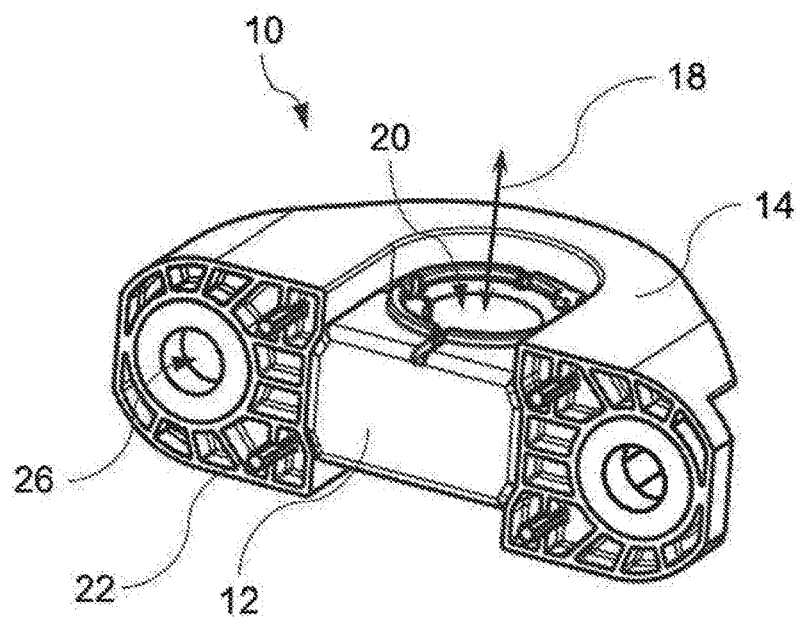
FIG. 1A shows a perspective view of an embodiment of the bracket, shown without the second bracket element.

FIG. 1A shows an embodiment of the bracket 10, comprising an elastomer element 12 arranged on or in a first bracket element 14. The second bracket element 16 is not shown in FIG. 1A for better visibility of the elastomer element 12. The elastomer element 12 can be designed substantially in the form of a block, the elastomer element 12 being able to fit snugly into the presently arched or U-shaped first bracket element 14.

The elastomer element 12 can include an opening 20 that penetrates the elastomer element 12 in an axial direction 18. The opening 20 can be designed to receive a stabilizer spring (not shown). The elastomer element 12 can be held in the first bracket element 14 in a positive manner, as a result of which axial slipping out, i.e. in the axial direction 18, from the first bracket member 14 can be prevented. The elastomer element 12 can also be connected to the stabilizer spring in a mounted state of the bracket 10, for example by means of cold gluing or vulcanization. In addition, the elastomer element 12 can be frictionally clamped in the first bracket element 14, namely by creating a preload in the elastomer element 12. This preload can be formed by connecting the first and the second bracket element 14, 16 via the connecting means 22, 24. After the connection state shown in FIG. 1B has been established, the elastomer element 12 can be fixed between the first and the second bracket element 14, 16 and, if necessary, preloaded. Such a preload ensures optimal support of the stabilizer spring. In particular, this preloaded state can be created by the connection means 22, 24 before the actual mounting of the bracket 10 on the vehicle (not shown), which can simplify the assembly.

The elastomer element 12 can be formed from a material that can be connected to the stabilizer spring by means of an adhesion promoter and vulcanization or by means of an adhesive by means of cold gluing. Axial slipping or twisting of the elastomer element relative to the stabilizer spring, for example during transport or during operation of the vehicle stabilizer, can thus be avoided.

The bracket 10 can have a plurality of connection pins 22, in the present case four connection pins 22, on the first bracket element 14 as part of the connection means 22, 24. The connection pins 22 can be arranged on the end face of the arc-shaped first bracket element 14 opposite the arc, in particular on the side facing the second bracket element 16, and extend substantially orthogonally to the axial direction 18. The connection pins 22 are formed in order to be inserted or pressed into complementary connection recesses 24, which are formed on the second bracket element 16 as a further part of the connecting means 22, 24. Due to the fact that the elastomer element 12 protrudes from the end face of the arc-shaped first bracket element 14 opposite the arc, the elastomer element 12 can preloaded in the connection state of the bracket 10.

To establish the connection state of the bracket 10, the connection pins 22 can be inserted into the connection recesses 24 and fixed there. This fixation can take place by means of a force or friction fit and/or a cohesive fit between the connection pins 22 and connection recesses 24. In the present case, the connection pins 22 are pressed into the connection recesses 24 by means of press fitting.

Figure 1B:
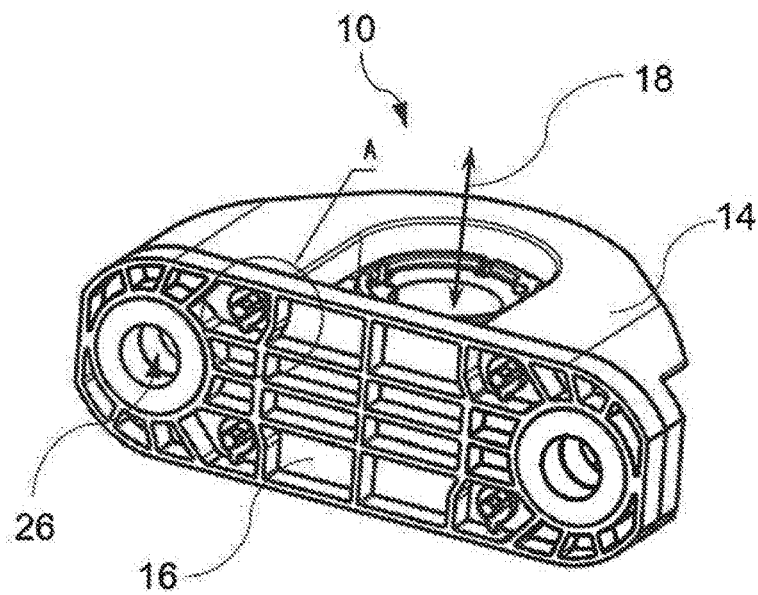
FIG. 1B shows a perspective view of the bracket of FIG. 1A, shown with the second bracket element.
Figure 1C:
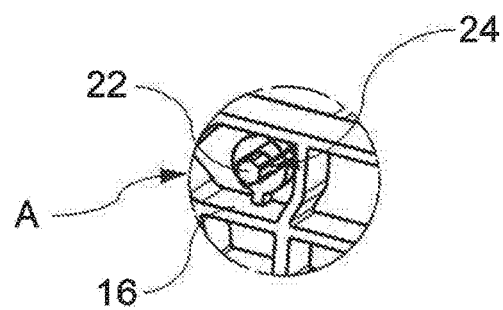
FIG. 1C shows a view of detail A of FIG. 1B.

FIG. 1C shows the detail A of FIG. 1B. The connection pin 22 is pressed into the connection recess 24 and a free end of the connection pin 22 protrudes only slightly.

Figure 2A:
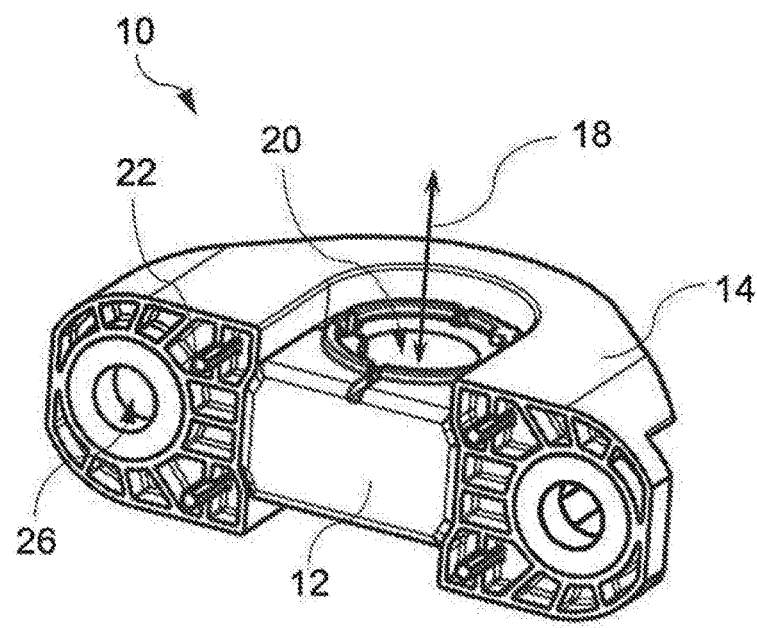
FIG. 2A shows a perspective view of a further embodiment of the bracket, shown without the second bracket element.
Figure 2B:
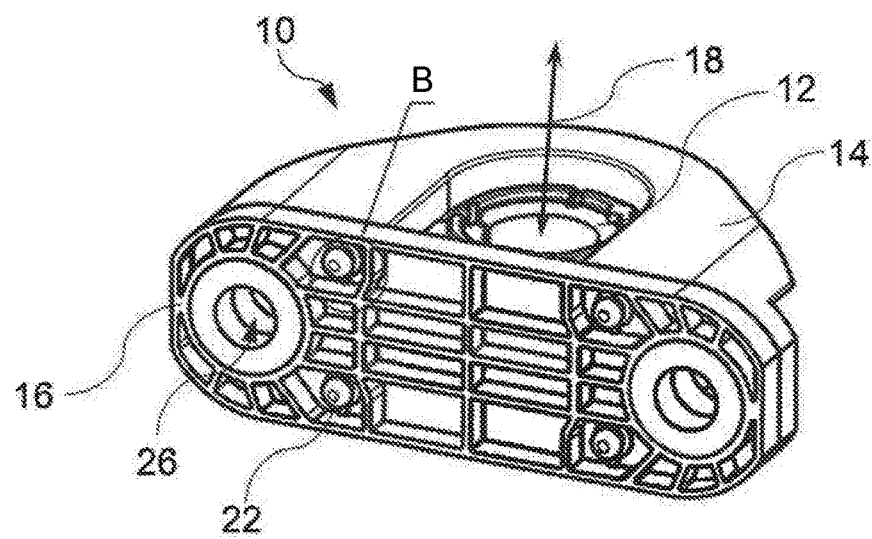
FIG. 2B shows perspective view of the bracket of FIG. 2A, shown with the second bracket element.
Figure 2C:
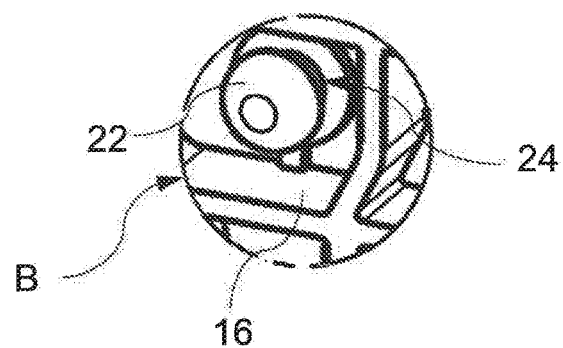
FIG. 2C shows a view of detail B of FIG. 2B.

As an alternative to the embodiment described above, in which the connection state is formed by means of a press fit and/or gluing, the fixation can also be created by riveting of the connection pins 22, as shown in FIGS. 2B and 2C. To this end, the connection pins 22 can be formed longer than the connection pins of the embodiment, which is connected by means of a force or friction fit. This can provide sufficient material for the riveting process. Ultrasonic riveting, for example, can be used as the riveting process. In addition to ultrasonic riveting, other thermal riveting processes or mechanical riveting processes can also be used. FIG. 2A shows the first bracket element 14 comprising the connection pins 22, which in the present case are formed as elongated rivet pins. Like the first bracket element 14, the rivet pins can be formed from a thermoplastic.

Figure 3A:
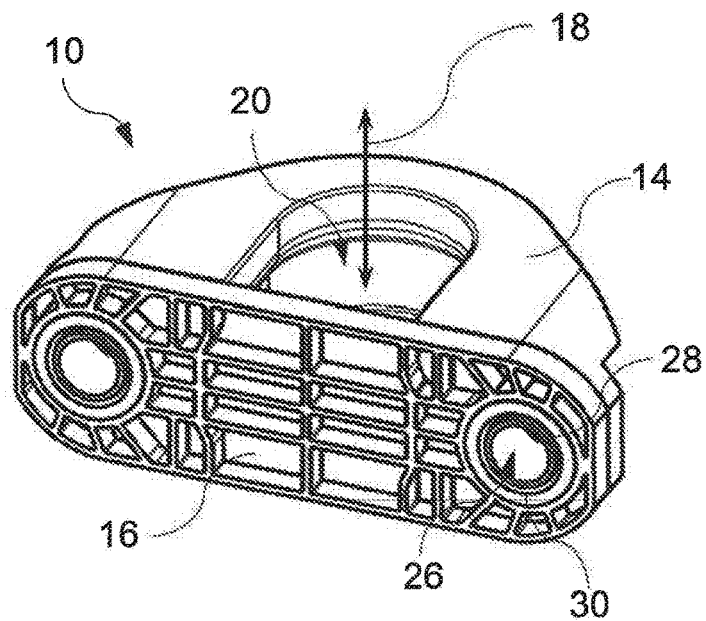
FIG. 3A shows a perspective view of a further embodiment of the bracket without an elastomer element.
Figure 3B:
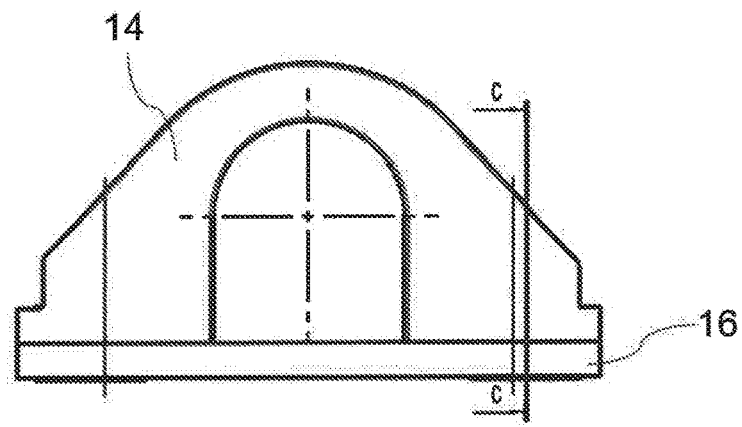
FIG. 3B shows a side view of the bracket of FIG. 3A.
Figure 3C:
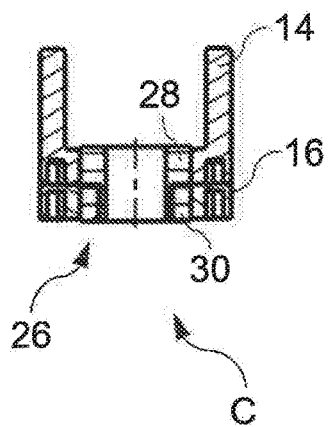
FIG. 3C shows a view of the detail C of FIG. 3B.
Figure 3D:
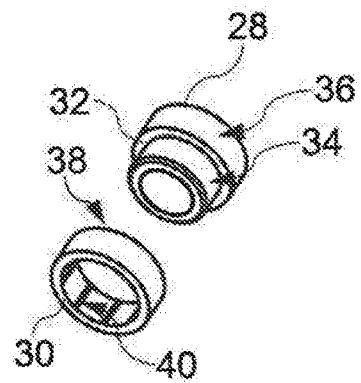
FIG. 3D shows a perspective view of an embodiment of the first and second connection sleeves.

FIGS. 3A and 3B show a further embodiment of the bracket, in which the connecting means is designed as a first and a second connection sleeve 28, 30. The elastomer element 12 is not shown in FIGS. 3A and 3B. The first connection sleeve 28 and the second connection sleeve 30 can each be formed substantially as a hollow cylinder. FIG. 3C shows the sectional area C of FIG. 3B, FIG. 3D shows the connection sleeves in a perspective view: The first connection sleeve 28 can comprise a step 32 running along its outer circumference. This step 32 can delimit two regions 34, 36 of the first connection sleeve 28 having different outside diameters from one another. The step 32 can form an abutment which, after the insertion of the first connection sleeve 28 into the second connection sleeve 30, abuts against an end face 38 of the second connection sleeve 30. If the first connection sleeve 28 is inserted into the second connection sleeve 30, so that the step 32 abuts against the end face 38 of the second connection sleeve 30, the region 34 of the first connection sleeve 28 with the smaller outside diameter is inserted into the second connection sleeve 30. The shell surface of the region 34 of the first connection sleeve 28, having the smaller outer diameter, can also be referred to as the outer circumferential surface of the first connection sleeve 28. Consequently, a maximum insertion depth of the first connection sleeve 28 into the second connection sleeve 30 can be predetermined.

The region 36 of the first connection sleeve 28, having the larger outer diameter, can be arranged in a bracket recess 26 of the first bracket element 14 such that the outer circumference of the region 36 of the connection sleeve 28 is firmly connected to the bracket element 26, for example by means of overmolding, gluing or by means of another suitable joining method.

The second connection sleeve 30 can have an inner diameter that corresponds substantially to the outer diameter of the region 34 of the first connection sleeve 28, so that the outer circumferential surface of the first connection sleeve 28 can be inserted into the second connection sleeve 30 and can form a press fit. The second connection sleeve 30 can also have a plurality of ribs or a rib structure 40 on its inner diameter or on its inner circumferential surface, which extends along the axial direction of the connection sleeves 28, 30, i.e. in the direction in which the first connection sleeve 28 is inserted into the second connection sleeve 30 during assembly. The second connection sleeve 30 can be made in one piece with the ribs 40 in a simple manner by means of extrusion. Alternatively or additionally, the ribs 40 can also be formed at the region 34 of the first connection sleeve 28 with the smaller outer diameter or the outer circumferential surface of the first connection sleeve 28.

The second connection sleeve 30 can be arranged in a bracket recess 26 of the second bracket element 16 and can be firmly connected to the second bracket element 16, for example by means of overmolding, gluing or by means of another suitable joining method.

When the first connection sleeve 28 is pressed into the second connection sleeve 30, the ribs 40 can be elastically and/or plastically deformed. A press fit can thereby be formed, in which it is avoided that the second connection sleeve 30 expands in such a way that the second bracket element 16 is damaged in the region of the second connection sleeve 30. The first and second connection sleeves 28, 30 can be formed from a metallic material, such as aluminum or steel.

The first connection sleeve 28 and the second connection sleeve 30 can form a mounting structure for the bracket 10 in the connection state. Thus, the first and second bracket elements 14, 16 can be connected by means of the first and second connection sleeves 28, 30, at the same time mechanically stabilize the mounting recesses 26 and provide the mounting structure by means of which the bracket 10 can be fastened or screwed to a vehicle body. Here, the mounting structure can protrude such that the second bracket element is spaced from the vehicle body in a mounted state of the bracket 10 on a vehicle body. In the present case, the mounting structure is a mounting recess through which a mounting screw (not shown) can be inserted.

The embodiments shown in the context of this description each have two bracket recesses 26 or mounting recesses on both the first and the second bracket element 14, 16. One bracket recess 26 of the first bracket element 14 can correspond to a bracket recess 26 of the second bracket element 16 in such a way that the bracket recesses 26 of the first and second bracket elements 14, 16 are arranged concentrically to one another in the connection state. The bracket recesses 26 can have a reinforcement, such as the connection sleeves 28, 30, or a ring made of a metallic material. The bracket 10 can be fastened to the vehicle body (not shown) by means of the reinforced bracket recesses 26 or mounting recesses. The first and second bracket elements 14, 16 and the connection pins 22 can each be formed from a plastic, in particular by means of injection molding.

Other Configurations

According to one embodiment, a bracket for a vehicle stabilizer is provided, and the bracket comprises an elastomer element that receives a stabilizer spring, a first bracket element and a second bracket element. The first bracket element and the second bracket element are connectable in such a way that the elastomer element is fixed between the first bracket element and the second bracket element. A connection means for connecting the first bracket element and the second bracket element is formed on the first and second bracket elements, and the connection means has at least one connection pin and a connection recess. In a connection state of the first bracket element and of the second bracket element, the connection pin is inserted into the connection recess, and in the connection state the connection pin is frictionally fixed (fixed in a force-fit manner) in the connection recess and/or the connection pin is riveted in the connection recess in a positive (form fit) manner and/or the connection pin is cohesively fixed (fixed by substance-to-substance bond) in the connection recess.

Due to the connection pin, which in the connection state is frictionally and/or cohesively fixed in the connection recess and/or is riveted in a positive manner, the bracket can have a high torsional stiffness in the connection state and in the state mounted on the vehicle, wherein damage to the elastomer element and/or the bracket or slipping of the elastomer element and/or the bracket in the mounted state of the vehicle stabilizer is avoided. This torsional stiffness can be achieved by means of the connection means in that, in the connection state, a bending and/or torsional force acting on one of the bracket elements can be effectively transmitted to the other bracket element via the connection means. In addition, this configuration represents, in a particularly simple manner, a transport lock that is easy to manufacture and simplifies the assembly of the vehicle stabilizer or the stabilizer spring.

The connection state can be a state in which the first bracket element abuts against the second bracket element, in particular in a target final assembly state. Here, the connection pin can be inserted into or pushed through the connection recess with its substantially entire free-standing dimension. However, the connection state can also only be a state in which the first bracket element is connected via the connection means, but does not abut one another, wherein such a state can also be referred to as a transport state. A part of the free-standing dimension of the connection pin can remain here, which is not (yet) inserted into or pushed through the connection recess.

The elastomer element can be substantially block-shaped. The elastomer element can be fitted into the first bracket element with a precise fit, in which case the outer contour of the elastomer element can be adapted to the inner contour of the first bracket element. The elastomer element can further have an opening penetrating the elastomer element for receiving a stabilizer spring, wherein the opening can be substantially cylindrical and can be arranged approximately centrally in the elastomer element. The elastomer element can have one or more projections along its circumference, as a result of which a positive fit can be formed between the elastomer element and the first bracket element. Due to the projections, a lateral or axial displacement of the elastomer element relative to the first bracket element can be avoided. Axial displacement can be understood here in particular to mean a displacement in the direction of the longitudinal axis of the stabilizer spring or the opening of the elastomer element. In addition or as an alternative to this, the elastomer element can be clamped frictionally between the first and second bracket elements, as a result of which a preload (pre-tension) can be generated in the elastomer element. This preload can be formed after the elastomer element has been fitted into the first bracket element by connecting the first and second bracket elements via the connection means. After the connection state has been established, the elastomer element can be fixed between the first and second bracket elements under preload. However, the connection state can also be free of preload, and the preload can only be applied when the stabilizer spring is finally mounted on the vehicle, when the first and second bracket elements are pressed together by mounting screws.

The elastomer element can be made of a material that can be connected to the stabilizer spring by means of an adhesion promoter and vulcanization or by means of an adhesive, in particular by cold gluing. Reaction adhesives, such as cyanoacrylate, polyurethane or epoxy adhesives, are possible adhesives. By connecting the elastomer element to the stabilizer spring, slipping or twisting of the elastomer element relative to the stabilizer spring, for example during transport or during operation of the vehicle stabilizer, can be avoided. In principle, other suitable methods can also be considered with regard to the types of connection. It is also possible to frictionally connect the stabilizer spring to the elastomer body. Clamped elastomer elements may be considered as frictional solutions with high static friction, and sliding elastomer elements may be considered as frictional solutions with sliding friction.

In a plan view, the first bracket element can be approximately semicircular or approximately omega-shaped or approximately arc-shaped. The first bracket element can also be described as approximately U-shaped. The first bracket element has an open side in the radial direction, from which the elastomer element can be at least partially inserted into the first bracket element. The radial direction here means a direction transverse to the axial direction or longitudinal direction of the opening of the elastomer element. The first bracket element can also be referred to as the first clamp part. In the connection state of the bracket elements, the first bracket element partially encloses or encompasses the elastomer element. The elastomer element can be arranged in the first bracket element in such a way that the stabilizer spring can be supported in the opening of the elastomer element and can be surrounded by the bracket elements.

The second bracket element can be formed such that after the connection state has been established, the elastomer element is fixed between the first bracket element and the second bracket element. In particular, the second bracket element can close the open side of the first bracket element in the connection state. The side of the second bracket element facing away from the first bracket element in the connection state can be designed substantially flat or planar in order to be able to abut against the vehicle body during assembly. The side of the second bracket element facing the first bracket element in the connection state can likewise be substantially flat or planar, but can also have projections and/or recesses that are adapted to the shape of the elastomer element and/or the first bracket element. In the simplest case, the second bracket element can be substantially plate-shaped or bar-shaped. The second bracket element can also be referred to as a second clamp part.

Both the first bracket element and the second bracket element can each have mounting recesses at their two ends, seen transversely to the axial direction. In the connection state, the two mounting recesses of the first bracket element and the two mounting recesses of the second bracket element can each be arranged concentrically to one another and each form a common mounting recess. The common mounting recess can correspond to the mounting structure described below. The mounting recesses can be cylindrical recesses. Mounting screws can be inserted through the mounting recesses to screw the bracket to the vehicle. The mounting recesses can be formed by the first and second connection sleeves described below.

A connection means is formed on the first and the second bracket element. One or a plurality of connection pins can be formed on the first and/or second bracket element as the connection means, while a corresponding number of complementary connection recesses can be formed on the other bracket element. A bracket element can therefore have both one or more connection pins and one or more connection recesses. In an exemplary embodiment, the first bracket element can have 2, 3, 4, 5, 6, 7 or 8 connection pins, whereas the second bracket element accordingly has 2, 3, 4, 5, 6, 7 or 8 connection recesses. In order to increase the rigidity of the bracket particularly effectively, the connection pins or the connection recesses, seen in a direction transverse to the axial direction, can each be arranged between a mounting recess and the elastomer element. In addition, the connection pins or the connection recesses can be arranged at the axial ends of the first or of the second bracket element.

To establish the connection state, the connection pin can be inserted into the connection recess and fixed there. The connection pin and the connection recess can be configured such that in the connection state the free end of the connection pin, which is pushed through the connection recess, protrudes from the connection recess. The connection pin can be substantially cylindrical, that is to say can have a substantially circular cross section transverse to the extension direction of the connection pin. However, the cross section of the connection pin transverse to the extension direction can also be polygonal, oval, elliptical or the like. The cross section of the connection recess transverse to the extension direction of the connection recess can be designed in accordance with the cross-sectional shape of the connection pin.

The connection pin can be fixed in the connection recess by means of a friction fit between the connection pin and the connection recess, in particular by means of a press fit or an interference fit. Alternatively or in addition, the fixation can also be achieved by riveting the connection pin. Ultrasonic riveting can be used as a method for this. In addition to ultrasonic riveting, other thermal riveting processes or mechanical riveting processes can also be used. When riveting, the free end of the connection pin inserted through the connection recess can be brought into a mushroom shape, so that a positive connection is produced. Alternatively or additionally, the connection pin can be fixed in the connection recess by means of a cohesive fit between the connection pin and the connection recess, in particular by means of gluing or welding.

If the connection state is established in such a way that the first and second bracket elements are pressed on block, the connection of the first and the second bracket element can be carried out particularly easily. In the present case, the term "press on block" can be understood to mean that the first or the second bracket element is pressed onto the other bracket element until full-area contact is established at the contact points of the bracket elements.

The first and the second bracket element can each be formed from a plastic or metal or a combination of these materials (hybrid). The bracket elements and the connection pin can be made in one piece and of the same material. However, the connection pin can also comprise a different material than the corresponding bracket element, for example by means of two-component injection molding. Thermoplastics, such as polyamide, polyethylene and/or polypropylene, are possible materials for the bracket elements and the connection pin. Thus, the bracket can be manufactured in an inexpensive and corrosion-resistant way.

In the connection state, the bracket can fix the elastomer element with a preload between the first bracket element and the second bracket element.

The bracket can thus be delivered in a pre-mounted state, in particular pre-mounted on the stabilizer spring. All components can already be set to the desired final dimension or voltage. This advantageously enables the mounting screw for mounting the bracket on the vehicle to be chosen to be shorter, since when mounting the bracket on the vehicle, no distance between the bracket elements has to be overcome in order to generate the preload. Furthermore, the necessary screw path can be shortened, which simplifies assembly. Also, the tension of the elastomer element does not have to be taken into account when mounting the bracket. In addition, the preload can optionally be used when connecting the elastomer element to the stabilizer spring by means of vulcanization or gluing, as will be described below.

The preload applied to the elastomer element enables optimal contact between the elastomer element and the stabilizer spring. This increases the durability and operational reliability of the bracket elements, the elastomer element and the stabilizer spring. In addition, the bracket can be screwed to the vehicle body without any further manufacturing steps, such as fitting a rubber bearing into a fastening clamp. A change in the tension in the elastomer element by screwing the bracket to the vehicle body can be avoided.

The frictional fixation of the connection pin in the connection recess in the connection state can be created by means of a press fit.

For example, the first and the second bracket element can be pressed on block by means of a press fit, i.e. until the two bracket elements abut against each other, whereby the connection pin can be pressed into the connection recess with its entire free length or maximally in the connection state. Alternatively, the connection pin can only be partially pressed into the connection recess in the connection state, wherein in particular no preload can be generated in the elastomer element. The partial pressing can serve in particular to secure the transport safety of the two bracket elements and the elastomer element. A play between the two bracket elements can be avoided by means of the press fit, as a result of which the rigidity of the bracket can be increased.

The press fit can be dimensioned such that the preload force of the elastomer element can be applied by the connection pin and the connection recess.

The connection pin can be riveted by means of thermal reshaping of a free end of the connection pin.

The riveting process allows the first and second bracket elements to be connected in a simple manner. Ultrasonic welding or ultrasonic riveting or, alternatively, a suitable thermal or mechanical method are particularly suitable as the forming or riveting method. The connection pin or the rivets can be designed such that the preload force of the elastomer element can be applied by the connection pin and the connection recess after riveting.

In the case of riveting, the connection pin can be dimensioned such that it forms a clearance fit, a transition fit or a press fit with the connection recess before riveting. At least after riveting can a play between the two bracket elements be avoided, whereby the rigidity of the bracket can be increased.

The cohesive fixation of the connection pin in the connection recess in the connection state can be created by means of adhesion.

According to another embodiment, a bracket for a vehicle stabilizer is provided, and the bracket comprises an elastomer element that receives a stabilizer spring, a first bracket element and a second bracket element. The first bracket element and the second bracket element are connectable in such a way that the elastomer element is fixed between the first bracket element and the second bracket element. A connection means for connecting the first bracket element and the second bracket element is formed on the first and second bracket elements, and the connection means has a first connection sleeve and a second connection sleeve. In a connection state of the first bracket element and of the second bracket element, the first connection sleeve is at least partially inserted into the second connection sleeve. In the connection state the first connection sleeve is frictionally fixed in the second connection sleeve. An outer circumferential surface of the first connection sleeve and/or an inner circumferential surface of the second connection sleeve has a rib structure.

The difference of the further aspect compared to the first aspect lies in the configuration of the connection means. Otherwise, the above explanations with regard to the first aspect also apply to the further aspect accordingly. It should be noted that the first aspect can be combined with the further aspect, i.e. the connection means can have both a connection pin and a connection recess and also a first connection sleeve and a second connection sleeve.

The first connection sleeve can be formed substantially as a hollow cylinder. Furthermore, the first connection sleeve can have a step running along its outer circumference. This step can delimit two regions of the first connection sleeve that have mutually different outside diameters. The step can form an abutment which, after the insertion of the first connection sleeve into the second connection sleeve, abuts against an end face of the second connection sleeve. If the first connection sleeve is inserted into the second connection sleeve, so that the step abuts the second connection sleeve, the region of the first connection sleeve with the smaller outside diameter is inserted into the second connection sleeve. A maximum insertion depth of the first connection sleeve into the second connection sleeve can therefore be predetermined by the step. The region of the first connection sleeve, which is formed for insertion into the second connection sleeve, can have the outer circumferential surface of the first connection sleeve with the rib structure.

The other region of the first connection sleeve, having the larger outer diameter, can be firmly connected to one of the two bracket elements, for example by means of overmolding, gluing or by means of another suitable joining method. The outer surface of the second connection sleeve can be firmly connected to the other of the bracket elements, likewise e.g. by means of overmolding, gluing or by means of another suitable joining method. By way of example, the first connection sleeve can be connected to or embedded in the first bracket element, and the second connection sleeve can be connected to or embedded in the second bracket element.

The second connection sleeve can also be formed substantially as a hollow cylinder. The second connection sleeve can have an inner diameter that corresponds substantially to the outer diameter of the region of the first connection sleeve formed for insertion into the second connection sleeve. The first connection sleeve and the second connection sleeve can form a press fit or an interference fit. Alternatively or in addition to the rib structure on the outer circumferential surface of the first connection sleeve, the second connection sleeve can have a rib structure on its inner circumferential surface. The rib structure can extend in the direction in which the first connection sleeve is inserted into the second connection sleeve during assembly. In other words, one or more ribs on the outer circumferential surface of the first connection sleeve and/or on the inner circumferential surface of the second connection sleeve can extend substantially in the axial direction of the respective connection sleeve. The rib structure can comprise 1, 2, 3, 4, 5, 6, 7, 8 or more ribs, wherein the ribs can be arranged at regular intervals with respect to each another.

The rib structure can be produced in one piece with the corresponding connection sleeve by means of extrusion, which is particularly easy to realize for the second connection sleeve. As an alternative to this, the rib structure can also be produced by means of other forming techniques or by means of machining production processes.

When the first connection sleeve is inserted or pressed into the second connection sleeve, the ribs can each deform elastically and/or plastically, as a result of which the desired connection can be provided by the bracket elements without excessively widening the second connection sleeve. Damage to the first or second bracket element by such an expansion can therefore advantageously be prevented.

The first and the second connection sleeve can be formed from a metallic material, such as aluminum or steel.

The first connection sleeve and the second connection sleeve can form a mounting structure for the bracket in the connection state.

Thus, the first and second bracket elements can be connectable by means of the first and second connection sleeves, wherein they are at the same time mechanically stabilized by means of the connection sleeves and a stable mounting structure is formed. The bracket can be connected to the vehicle body via the mounting structure, for example by screwing.

In particular, both the first bracket element and the second bracket element can each have two first connection sleeves and two second connection sleeves, each of which can be arranged at their two ends, seen transversely to the axial direction of the opening of the elastomer element. In this case, each connection sleeve can form a mounting recess. In the connection state, a pair of first connection sleeve and second connection sleeve is connected, and each can form a mounting structure in the form of a common mounting recess. Mounting screws can be inserted through the common mounting recesses in order to screw the bracket to the vehicle.

Also in the bracket according to the further aspect, the elastomer element can be fixed with a preload between the first bracket element and the second bracket element in the connection state.

According to another embodiment, the disclosure provides a vehicle stabilizer, comprising a stabilizer spring and a bracket, wherein the stabilizer spring is received in the elastomer element, the first bracket element and the second bracket element are in the connection state, and the elastomer element is fixed between the first bracket element and the second bracket element.

The above explanations with regard to the bracket of the first and further aspects also apply to the vehicle stabilizer according to the further aspect.

According to another embodiment, the disclosure provides a method for manufacturing a vehicle stabilizer, comprising: receiving a stabilizer spring in an elastomer element; providing a first bracket element and a second bracket element; providing a connection means, comprising a connection pin and a connection recess, on the first bracket element and the second bracket element; connecting the first bracket element and the second bracket element such that the elastomer element is fixed between the first bracket element and the second bracket element, the connection pin being inserted into the connection recess; and frictionally fixing (fixing in a force-fit manner) the connection pin in the connection recess and/or positively (by means of a form fit) riveting the connection pin in the connection recess and/or cohesively fixing (fixing by substance-to-substance bond) the connection pin in the connection recess in order to bring the first bracket element and the second bracket element into a connection state.

The above explanations with regard to the bracket of the first and further aspects also apply to the method according to the above further aspect.

According to another embodiment, to the disclosure provides a method for manufacturing a vehicle stabilizer, comprising: receiving a stabilizer spring in an elastomer element; providing a first bracket element and a second bracket element; providing a connection means, comprising a first connection sleeve and a second connection sleeve, on the first bracket element and the second bracket element; an outer circumferential surface of the first connection sleeve and/or an inner circumferential surface of the second connection sleeve having a rib structure; connecting the first bracket element and the second bracket element such that the elastomer element is fixed between the first bracket element and the second bracket element, the first connection sleeve being inserted into the second connection sleeve at least partially; and frictionally fixing the first connection sleeve in the second connection sleeve in order to bring the first bracket element and the second bracket element into a connection state.

The above explanations with regard to the bracket of the first and further aspects also apply to the method according to the above further aspect.

The methods can further include: connecting the stabilizer spring received in the elastomer element to the elastomer element by means of an adhesive or by means of vulcanization; and curing the adhesive or the vulcanization on at least partially in the connection state of the first bracket element and the second bracket element. In the connection state the elastomer element is fixed with a preload between the first bracket element and the second bracket element.

This allows arranging the elastomer element on the stabilizer spring and the preparatory measures for gluing or vulcanization (application of the adhesive or the adhesion promoter) to take place locally separated from the subsequent step of curing the adhesive or the subsequent step of vulcanization, whereby the productivity can be increased. This is possible because the first bracket element and the second bracket element can serve as a tool for applying the preload required for gluing or vulcanization in the elastomer body, i.e. no further tool is required for applying the preload during curing or vulcanization.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A bracket for a vehicle stabilizer, comprising:
an elastomer element that receives a stabilizer spring;
a first bracket element; and
a second bracket element,
wherein the first bracket element and the second bracket element are connectable in such a way that the elastomer element is fixed between the first bracket element and the second bracket element,
a connection means for connecting the first bracket element and the second bracket element is formed on the first and second bracket elements,
the connection means has a first connection sleeve and a second connection sleeve,
in a connection state of the first bracket element and of the second bracket element, the first connection sleeve is at least partially inserted into the second connection sleeve,
in the connection state the first connection sleeve is frictionally fixed in the second connection sleeve, and
an outer circumferential surface of the first connection sleeve and/or an inner circumferential surface of the second connection sleeve has a rib structure,
wherein in the connection state, the elastomer element is fixed between the first bracket element and the second bracket element with a preload.

2. The bracket according to claim 1, wherein the first connection sleeve and the second connection sleeve form a mounting structure for the bracket in the connection state.

3. A vehicle stabilizer, comprising:
a stabilizer spring; and
a bracket according to claim 1,
wherein the stabilizer spring is received in the elastomer element, the first bracket element and the second bracket element are in the connection state, and the elastomer element is fixed between the first bracket element and the second bracket element.

4. A method for manufacturing a vehicle stabilizer, comprising:
receiving a stabilizer spring in an elastomer element;
providing a first bracket element and a second bracket element;
providing a connection means, comprising a first connection sleeve and a second connection sleeve, on the first bracket element and the second bracket element, an outer circumferential surface of the first connection sleeve and/or an inner circumferential surface of the second connection sleeve having a rib structure;
connecting the first bracket element and the second bracket element such that the elastomer element is fixed between the first bracket element and the second bracket element, the first connection sleeve being inserted into the second connection sleeve at least partially; and
frictionally fixing the first connection sleeve in the second connection sleeve in order to bring the first bracket element and the second bracket element into a connection state,
wherein in the connection state, the elastomer element is fixed between the first bracket element and the second bracket element with a preload.

5. The method according to claim 4, further including:
connecting the stabilizer spring received in the elastomer element to the elastomer element by means of an adhesive or by means of vulcanization; and
curing the adhesive or the vulcanization on at least partially in the connection state of the first bracket element and the second bracket element.

* * * * *